(No Model.)
A. McNABB.
TOBACCO FERTILIZER DROPPER.
No. 334,458. Patented Jan. 19, 1886.
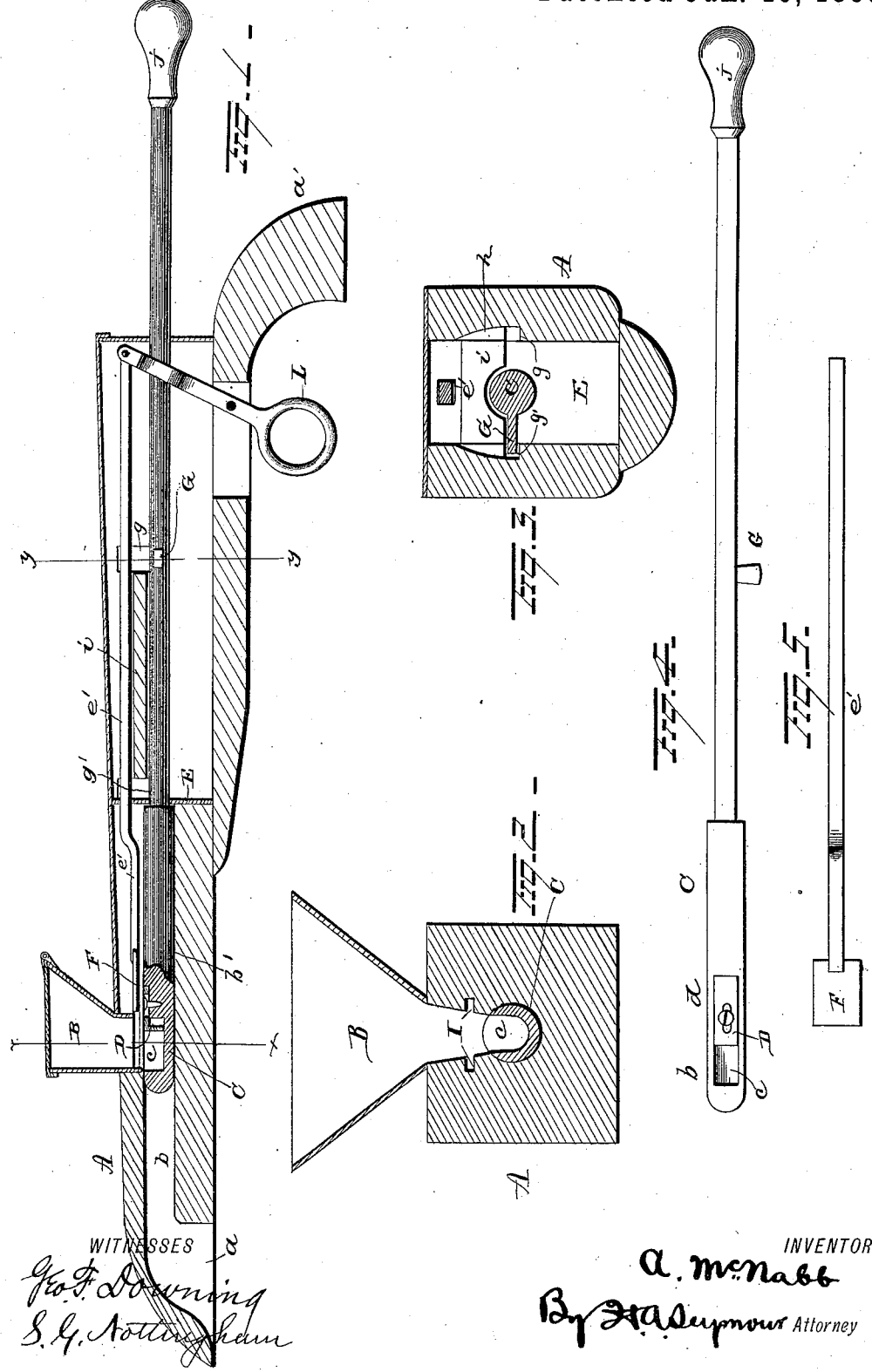
WITNESSES
Geo. F. Downing
S. G. Nottingham
INVENTOR
A. McNabb
By H. A. Seymour Attorney
N. PETERS, Photo-Lithographer, Washington, D. C.

UNITED STATES PATENT OFFICE.

ALEXANDER McNABB, OF BIG CREEK, TENNESSEE.

TOBACCO-FERTILIZER DROPPER.

SPECIFICATION forming part of Letters Patent No. 334,458, dated January 19, 1886.

Application filed May 28, 1885. Serial No. 166,978. (No model.)

*To all whom it may concern:*

Be it known that I, ALEXANDER MCNABB, a citizen of the United States, residing at Big Creek, in the county of Cocke and State of Tennessee, have invented a new and useful Machine for Fertilizing Tobacco, of which the following is a specification.

My invention relates to an improvement in hand-fertilizers, adapted more particularly for discharging a fertilizer onto tobacco-plant in the hill after the plant has been transplanted without injury to the plant or handling the fertilizing material; and it consists in the parts and combinations of parts more fully described, and pointed out in the claims.

In the accompanying drawings, Figure 1 is a longitudinal vertical sectional view taken through the feed-hopper. Fig. 2 is a transverse sectional view taken through the line $x$ of Fig. 1. Fig. 3 is a similar view on the line $y$ $y$ of the same figure. Fig. 4 is a detached view of the discharging or dropping device, and Fig. 5 is a similar view of the cut-off gate.

A represents a barrel or box, preferably rectangular in cross-section, and provided on one face near one end with an opening, $a$, through which the fertilizing material is discharged, and on its opposite face, at a point nearer the center of the barrel, with the hopper B, adapted to hold the fertilizing material. This barrel is also provided at the end opposite the opening $a$ with a handle, $a'$, by which the device is held and carried by the operator. The portion of the barrel between the opening $a$ and the hopper is provided with a circular bore, $b$, in which the cylindrical or enlarged end $b'$ of the conveyer C rests and moves. This cylindrical end $b$ is provided on one face with an elongated cavity, $c$, into which the material drops as it falls from the hopper B, and extends from the lower end of the barrel to a point beyond the hopper, and hence when the cavity in this cylindrical or enlarged portion of the conveyer has been moved from under the hopper the wall of the enlarged portion of the conveyer rests in close contact with the bottom of the hopper and prevents any of the fertilizing material from entering the barrel if the cut-off gate be accidentally left open.

D is a metallic plate forming one end of the recess or cavity $c$, and secured to the enlarged end of the conveyer by a screw, $d$. By loosening the screw the plate can be moved so as to increase or diminish the size of the recess or cavity $c$, as necessity demands.

E is a transverse partition or guide located within the barrel, and provided with openings for the passage of the stem $e'$ of the cut-off gate F. This gate F moves in grooves formed below the bottom of the hopper, and is adapted to cut off the supply of material to the conveyer. The stem $e'$ of the conveyer is provided with the lug or stop G, which latter is adapted to engage shoulders $g g'$, formed on the inner faces of the barrel, on opposite sides thereof, and prevent the conveyer from making more than one-half of a revolution. The barrel is also provided with the block $i$, located above the stem, and adapted to prevent the stem from being moved when the lug G is in a vertical position, or, that is, when the lug is in a position between any one set of the shoulders, and not in contact with either.

I are slots or guideways formed on the inner side faces of the box or barrel, and extending, respectively, between the shoulders $g$ and $g'$.

The lug G and the shoulders $g$ $g'$ are so arranged that when the lug rests on either shoulder $g$ or $g$, or in the groove between said shoulders, the cavity in the conveyer is presented toward the hopper, and when resting on either shoulder $g'$, or in the groove between said shoulders, the cavity is presented toward the discharge-opening.

The stem of the conveyer projects through the inner end of the box or barrel, and is provided with a handle, $j$, by which it is moved longitudinally and partly rotated. The shank of the cut-off gate is connected to the lever L, which latter projects through the casing and rests in close proximity to the handle $a'$.

From the foregoing it will be seen that by pulling on the handle $j$ the recess in the enlarged end of the conveyer is moved toward the opening, and the material can be discharged by turning the conveyer until the lug G strikes the opposite shoulder. The conveyer can be drawn toward the hopper with the cavity $c$ toward the opening, and given a half-turn after the conveyer reaches the end of its instroke, or it can be turned immediately after it has discharged its load and before being moved toward the hopper. Again, after the conveyer has been loaded, it can be turned before moving it toward the discharge end of the box or barrel. In this latter instance the material will drop from the cavity as soon as the conveyer reaches the end of its outstroke.

It is evident that numerous slight changes in the construction and relative arrangement of the several parts might be resorted to without departing from the spirit and scope of my invention; hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. The combination, with a barrel having a hopper and a discharge-opening, of a reciprocating and semi-rotary conveyer adapted to take the material from the hopper and convey it to the discharge-opening in the barrel, substantially as set forth.

2. The combination, with a barrel or box having a hopper and a discharge opening, of a cut-off gate and a reciprocating and semi-rotary conveyer adapted to move between the hopper and the discharge-opening, substantially as set forth.

3. The combination, with a box or barrel having a hopper and a discharge-opening, of a reciprocating and semi-rotary conveyer moving between the hopper and discharge-opening, and having a recess therein, and the movable plate for regulating the size of said cavity or recess, substantially as set forth.

4. The combination, with the box having the hopper, discharge-opening, shoulders, grooves, and block, of the reciprocating and semi-rotary conveyer provided with a lug, the above parts being combined and arranged substantially as set forth.

5. The combination, with the box or barrel having a hopper and discharge-opening, of the reciprocating and semi-rotary conveyer and the cut-off gate, all of the above parts constructed and operating substantially as described.

ALEXANDER McNABB.

Witnesses:
W. C. ANDERSON,
J. T. JONES.